US009651799B1

(12) United States Patent
Tsai

(10) Patent No.: US 9,651,799 B1
(45) Date of Patent: May 16, 2017

(54) EYEGLASSES ASSEMBLY

(71) Applicant: York Tsai, New Taipei (TW)

(72) Inventor: York Tsai, New Taipei (TW)

( * ) Notice: Subject to any disclaimer, the term of this patent is extended or adjusted under 35 U.S.C. 154(b) by 0 days.

(21) Appl. No.: 15/183,945

(22) Filed: Jun. 16, 2016

(51) Int. Cl.
*G02C 5/22* (2006.01)
*G02C 5/14* (2006.01)

(52) U.S. Cl.
CPC ........... *G02C 5/2209* (2013.01); *G02C 5/146* (2013.01); *G02C 2200/08* (2013.01)

(58) Field of Classification Search
CPC ......... G02C 5/22; G02C 9/02; G02C 2200/06
USPC .................... 351/116, 153, 111, 140; 16/228
See application file for complete search history.

(56) References Cited

U.S. PATENT DOCUMENTS 5,315,328 A * 5/1994 Hofmair .............. G02C 5/2209
351/121
6,231,181 B1 * 5/2001 Swab ..................... G02C 5/146
16/228

* cited by examiner

*Primary Examiner* — Hung Dang
(74) *Attorney, Agent, or Firm* — Brooks Kushman P.C.

(57) ABSTRACT

An eyeglasses assembly includes a rim unit, two temple members, and two coupling units interconnecting the temple members and the rim body. The coupling unit includes a first coupling member that has a slide groove including a non-limiting and a limiting groove section, and a second coupling member that engages the non-limiting and limiting groove sections to permit and prevent separation of the first and second coupling members, respectively. The coupling unit further includes a latch member movably mounted to the first coupling member and movable between a closed position and an open position that respectively prevents and permits the movement of the second coupling member into the non-limiting groove section.

6 Claims, 12 Drawing Sheets

US 9,651,799 B1

EYEGLASSES ASSEMBLY

TECHNICAL FIELD

The disclosure relates to an eyeglasses assembly, and more particularly to an eyeglasses assembly that is capable of quick detachment of temple members from a rim unit, and that has a latch function to prevent accidental separation of the temple members from the rim unit.

BACKGROUND

Following the current trend of lighter and thinner eyeglasses and eyeglasses lenses with increased functionalities, eyeglasses have transformed from vision correction tools into popular decorative and functional accessories. As such, some eyeglasses in recent years have been designed to allow for increased customization, offering users the choice of rims and temples of different types or functionalities according to their preferences. In addition, eyeglasses with easily replaceable rims and temples allow for increased versatility of use for the users.

Referring to FIGS. 1 and 2, a conventional eyeglasses assembly 1 is shown to include a rim unit 11 and a pair of temple units 12 that are connected pivotably and removably to the rim unit 11. The rim unit 11 includes a rim body 111, and two coupling members 112 (only one is shown in the figures) that are mounted respectively to left and right lateral sides of the rim body 111, and that are each T-shaped. Each of the temple units 12 includes a connecting member 121 that is connected removably to one of the coupling members 112 of the rim unit 11, and a temple member 122 connected integrally to the connecting member 121 and extending opposite to the coupling member 112. Each of the connecting members 121 includes a surrounding wall portion 124 surrounding to define a guiding groove 123, and a pair of shielding portions 125 mounted on the surrounding wall portion 124 and spaced apart from each other. The shielding portions 125 and the surrounding wall portion 124 cooperate to define the guiding groove 123 into a generally T-shaped section 126. Two limiting sections 127 are disposed on respective upper and lower sides of the T-shaped section 126 and are surrounded by the corresponding shielding portions 125 and the surrounding wall portion 124 (see FIG. 2).

Each of the coupling members 112 can be placed in the guiding groove 123 of a respective one of the T-shaped sections 126, and is slidable along the T-shaped section 126 so that upper and lower portions 113 of the coupling members 112 are extended into the corresponding limiting sections 127 respectively. In this manner, during assembly, the coupling members 112 engage the corresponding connecting members 121 as to connect the temple units 12 to the rim unit 11. When the user wishes to replace the temple units 12, the above steps can be reversed for disassembly of the eyeglasses. Thus, users can quickly and easily replace the rim unit 11 or the temple units 12.

However, when either one of the temple units 12 is impacted or pressed against, the connecting member 121 mounted fixedly on the corresponding one of the temple members 122 is prone to slide out along a corresponding one of the guiding grooves 123 and become separated from the connecting members 121. This detachment of the temple unit 12 from the rim unit 11 often causes users distress and negatively affects their eyeglasses-wearing experience.

SUMMARY

Therefore, an object of the present disclosure is to provide an eyeglasses assembly that can alleviate at least one of the drawbacks associated with the prior art.

According to the present disclosure, an eyeglasses assembly may include a rim unit, two temple members, and two coupling units. The rim unit includes a rim body. The two coupling units each pivotably and separably interconnects a respective one of the temple members and a respective one of two opposite lateral ends of the rim body.

The coupling unit includes a first coupling member, a second coupling member, and a latch member. The first coupling member is disposed on one of the corresponding temple member and the corresponding lateral end of the rim body, and has a slide groove including a non-limiting groove section, and a limiting groove section connected to the non-limiting groove section. The second coupling member is disposed on the other one of the corresponding temple member and the corresponding lateral end of the rim body. The second coupling member movably engages the slide groove in such a manner that the first and second coupling members are permitted to be separated from each other when the second coupling member engages the non-limiting groove section of the first coupling member, and are prevented from being separated from and are pivotable relative to each other when the second coupling member engages the limiting groove section.

The latch member is movably mounted to the first coupling member and is movable between a closed position and an open position. In the closed position, the latch member is inserted into the non-limiting groove section of the slide groove for preventing the second coupling member from moving into the non-limiting groove section. In the open position, the latch member is substantially removed from the non-limiting groove section to permit the second coupling member to engage the non-limiting groove section.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
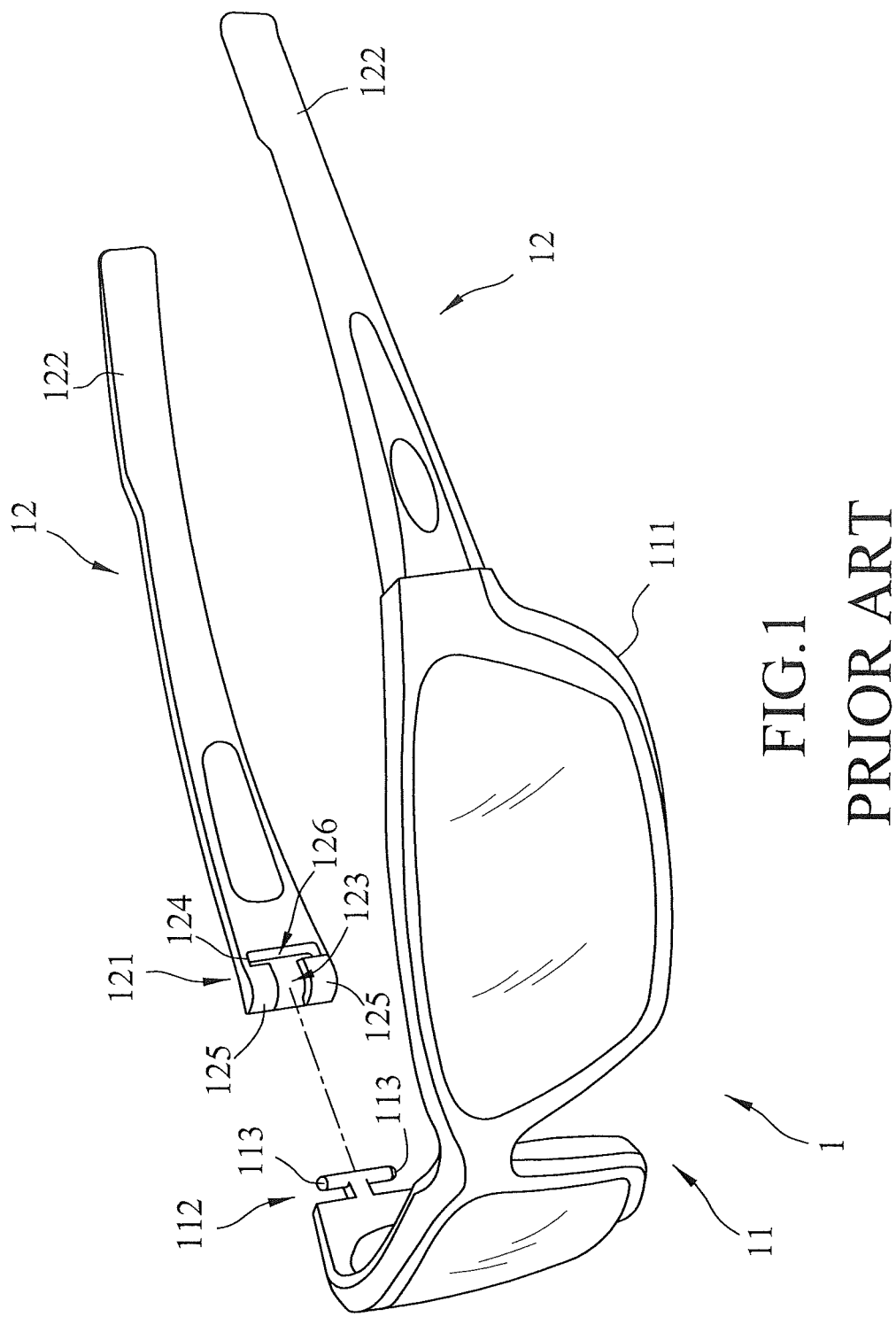
FIG. 1 is a partly exploded perspective view of a conventional eyeglasses assembly.
Figure 2:
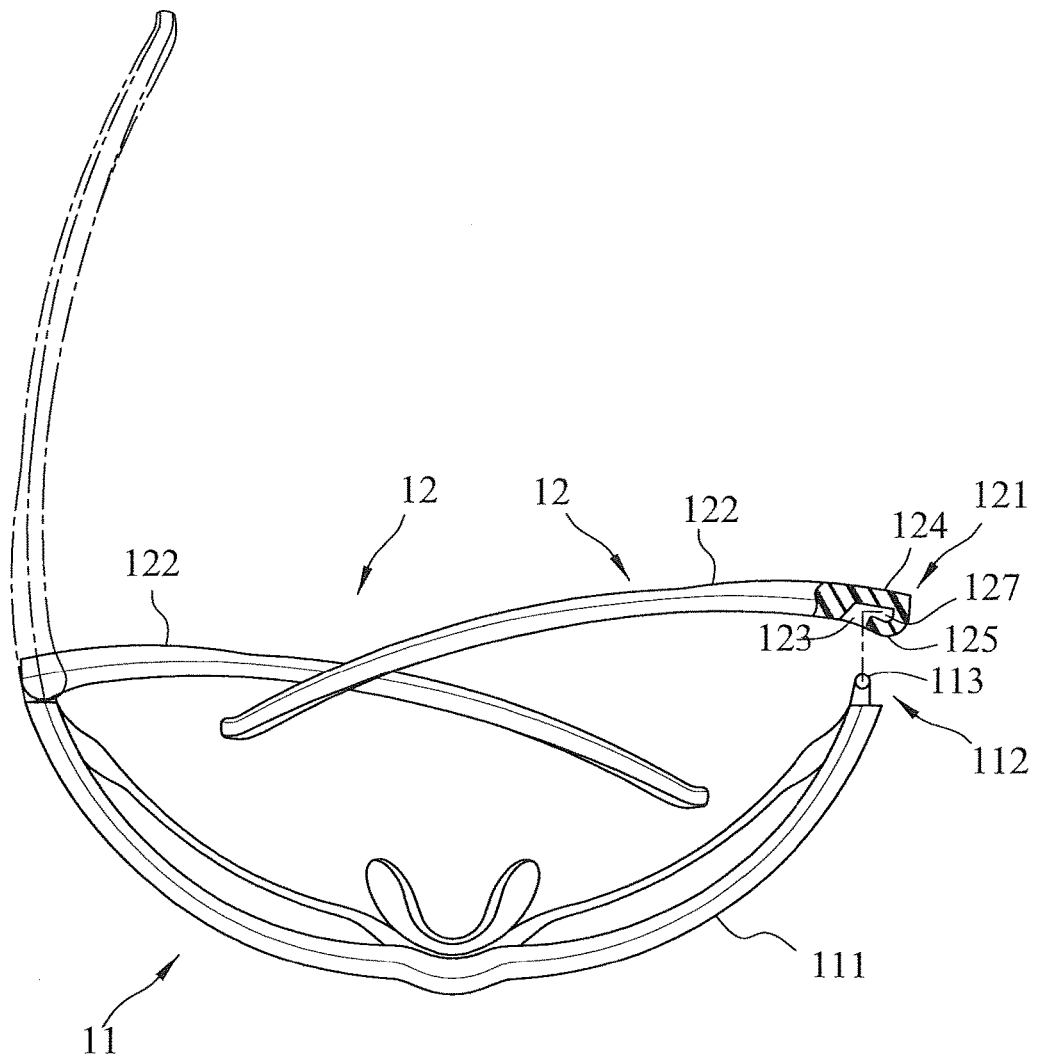
FIG. 2 is a partly sectional view showing a guiding groove and a coupling member of the conventional eyeglasses assembly.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
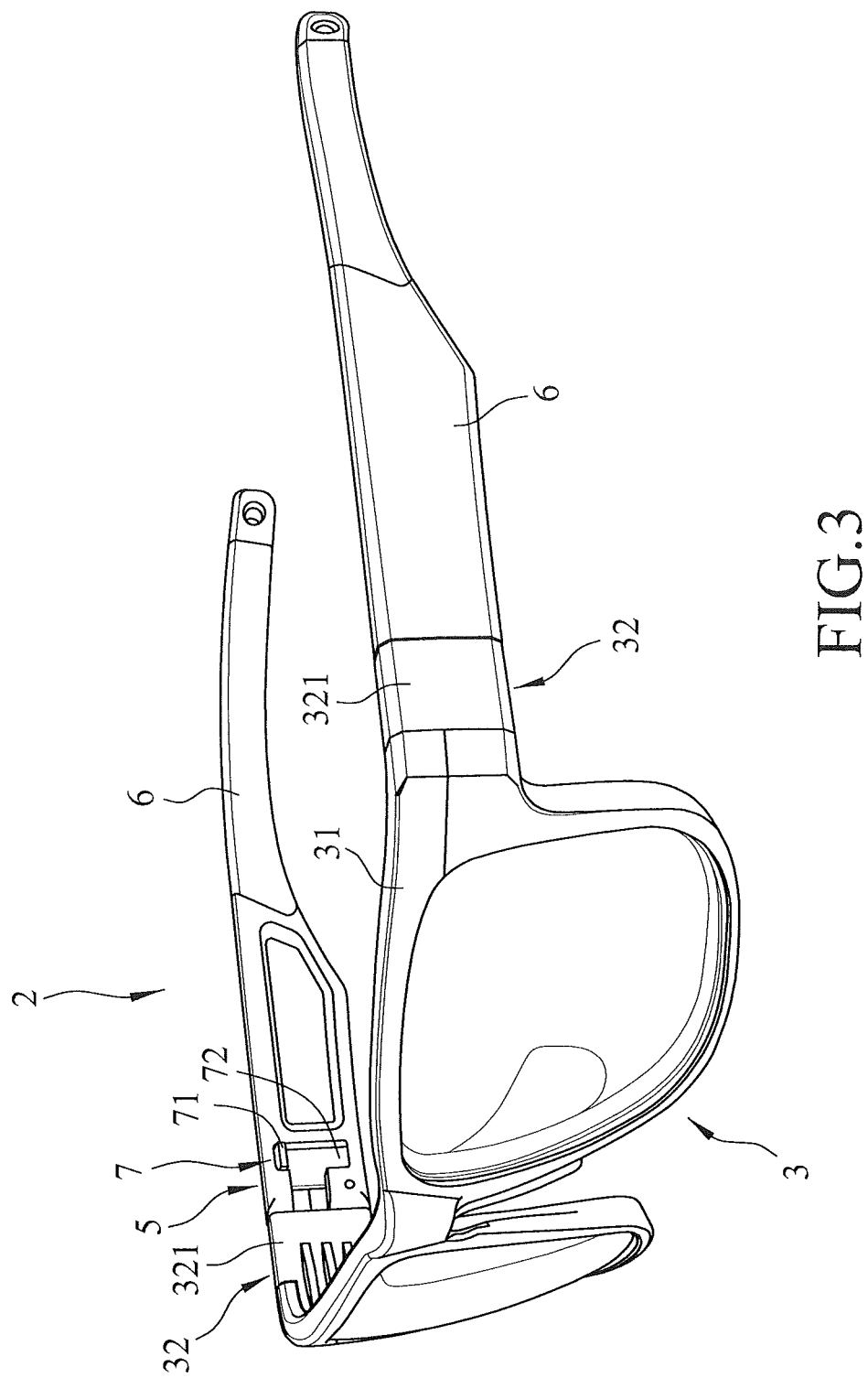
FIG. 3 is an assembled perspective view of a first embodiment of an eyeglasses assembly according to the present disclosure.
Figure 4:
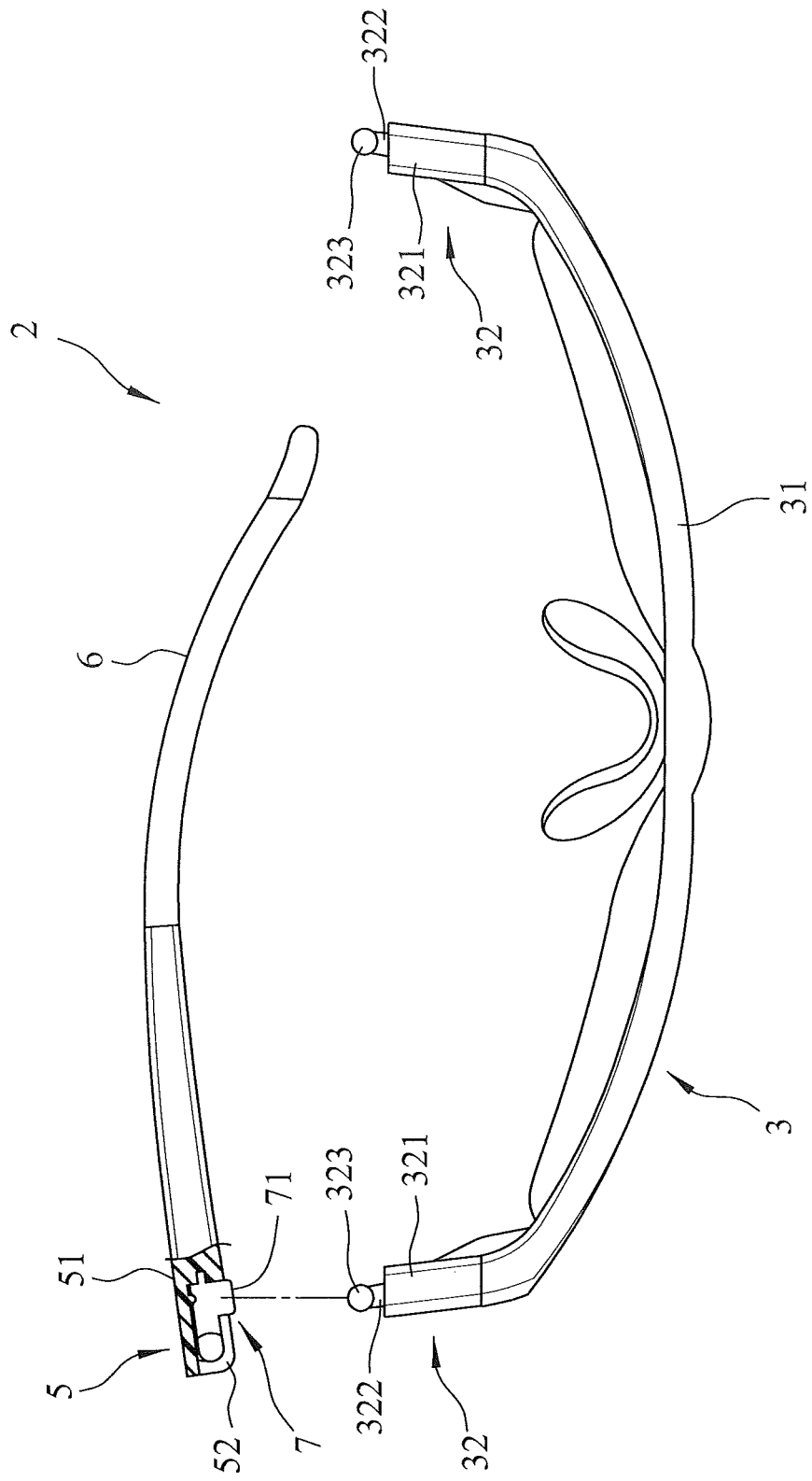
FIG. 4 is a partly sectional view illustrating a first coupling member and a second coupling member of the first embodiment.

Referring to FIGS. 3 and 4, a first embodiment of an eyeglasses assembly 2 according to the present disclosure is shown to include a rim unit 3, two temple members 6, and two coupling units. The rim unit 3 includes a rim body 31. The two coupling units each pivotably and separably interconnects a respective one of the temple members 6 and a respective one of two opposite lateral ends of the rim body 31. As the two coupling units are structurally identical to each other, only one of the two coupling units will be discussed hereinafter for the sake of brevity.

Figure 5:
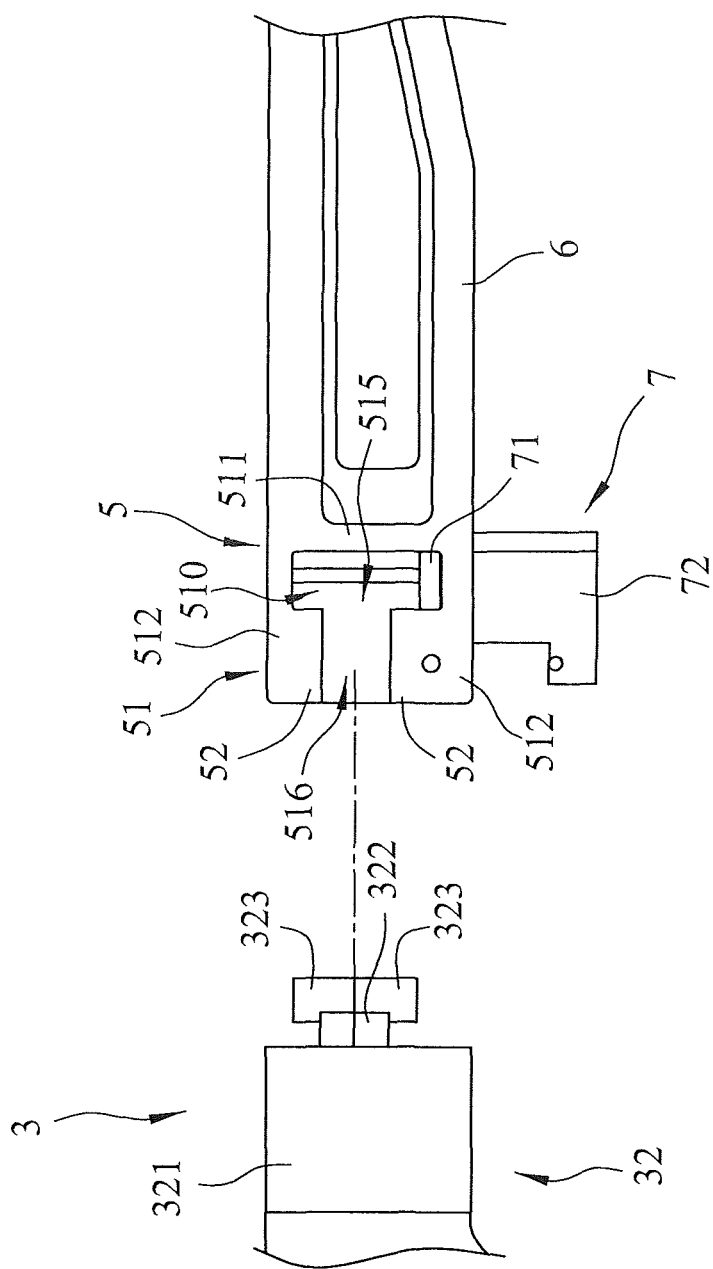
FIG. 5 is a fragmentary side view, illustrating the coupling manner of the first coupling member and the second coupling member of the first embodiment.
Figure 6:
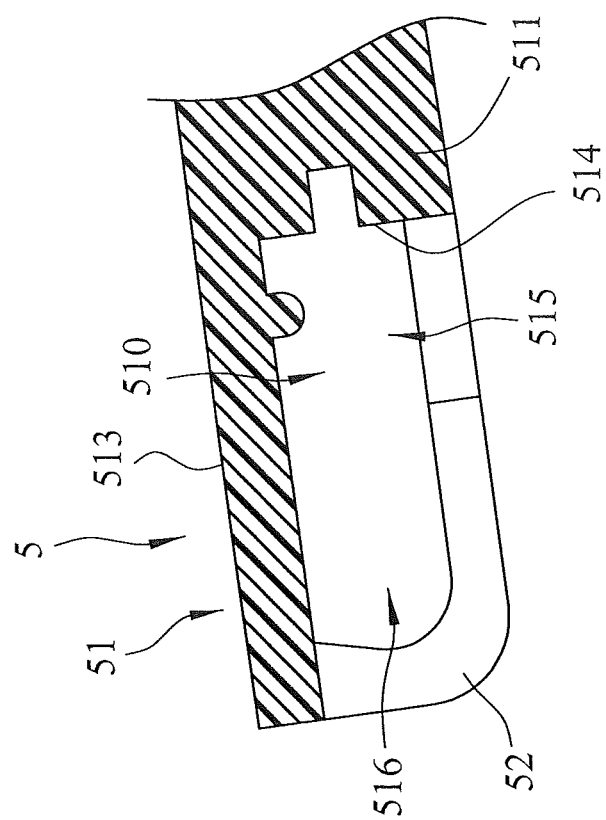
FIG. 6 is a fragmentary sectional view for further illustrating the first coupling member of the first embodiment.

As illustrated in FIGS. 5 and 6, the coupling unit of the first embodiment includes a first coupling member 5, a second coupling member 32, and a latch member 7. In this embodiment, the first coupling member 5 is disposed on the corresponding temple member 6, and has a slide groove 510 including a non-limiting groove section 515, and a limiting groove section 516 connected to the non-limiting groove section 515. The second coupling member 32 is disposed on the corresponding lateral end of the rim body 31 (see FIG. 3). The second coupling member 32 movably engages the slide groove 510 of the first coupling member 5 in such a manner that the first and second coupling members 5, 32 are permitted to be separated from each other when the second coupling member 32 engages the non-limiting groove section 515 of the first coupling member 5, and are prevented from being separated from each other and are pivotable relative to each other when the second coupling member 32 engages the limiting groove section 516 of the first coupling member 5.

As shown in FIG. 5, the first coupling member 5 of each of the coupling units of the first embodiment has a surrounding wall 51 substantially defining the slide groove 510, and two spaced-apart limiting walls 52 extending from the surrounding wall 51 toward each other, and cooperating with the surrounding wall 51 to define the limiting groove section 516.

In the first embodiment, the surrounding wall 51 of the first coupling member 5 of each of the coupling units has a base wall segment 511 that is connected to the corresponding temple member 6, two side wall segments 512 that are spaced apart from each other, an outer wall segment 513 (see FIG. 6) that extends from the base wall segment 511 and that interconnects the base wall segment 511 and the side wall segments 512 to substantially define the slide groove 510, and a through hole 514 that is formed in one of the side wall segments 512 for extension of the latch member 7 of the coupling unit therethrough. In particular, the two side wall segments 512 respectively extend from two opposite ends of the base wall segment 511 and away from the corresponding temple member 6, and respectively permit the side wall segments 512 to be connected thereto.

In addition, the second coupling member 32 of each of the coupling units may have a main body portion 321 connected to the corresponding lateral end of the rim body 31, an extension portion 322 extending from the main body portion 321 and away from the corresponding lateral end of the rim body 31, and two projections 323 spaced apart from each other and respectively extending from two opposite sides of the extension portion 322. In particular, each of the projections 323 may be limited in the limiting groove section 516 of the slide groove 510 by a respective one of the limiting walls 52 when the second coupling member 32 engages the limiting groove section 516 of the slide groove 510.

Furthermore, for each of the coupling units, the extension portion 322 of the second coupling member 32 may extend through a space between the limiting walls 52 of the first coupling member 5 when the second coupling member 32 engages the limiting groove section 516. In addition, the second coupling member 32 may be permitted to move along the slide groove 510 when the first and second coupling members 5, 32 cooperatively form a non-straight angle. In certain embodiments, the angle is a right angle.

In the first embodiment, the latch member 7 of the coupling unit is movably mounted to the first coupling member 5 and is movable between a closed position and an open position. In the closed position, the latch member 7 is inserted into the non-limiting groove section 515 of the slide groove 510 for preventing the second coupling member 32 from moving into the non-limiting groove section 515. In the open position, the latch member 7 is substantially removed from the non-limiting groove section 515 to permit the second coupling member 32 to engage the non-limiting groove section 515.

Specifically, the latch member 7 of the first embodiment includes a shielding portion 72 and a latching portion 71 protruding from the shielding portion 72. The shielding portion 72 is inserted into the non-limiting groove section 515 of the first coupling member 5 of the coupling unit when the latch member 7 is in the closed position, and substantially removed from the non-limiting groove section 515 of the first coupling member 5 when the latch member 7 is in the open position. The latching portion 71 is confined by the surrounding wall 51 for limiting the movement of the latch member 7 relative to the first coupling member 5.

It should be noted that in the first embodiment, each of the coupling units and the respective one of the temple members 6 are integrally formed. Also, each of the coupling units and the respective one of the two opposite lateral ends of the rim body 31 are integrally formed. However, what is disclosed herein may differ in actual practice, and should not be imposed as an implementation limitation.

Figure 7:
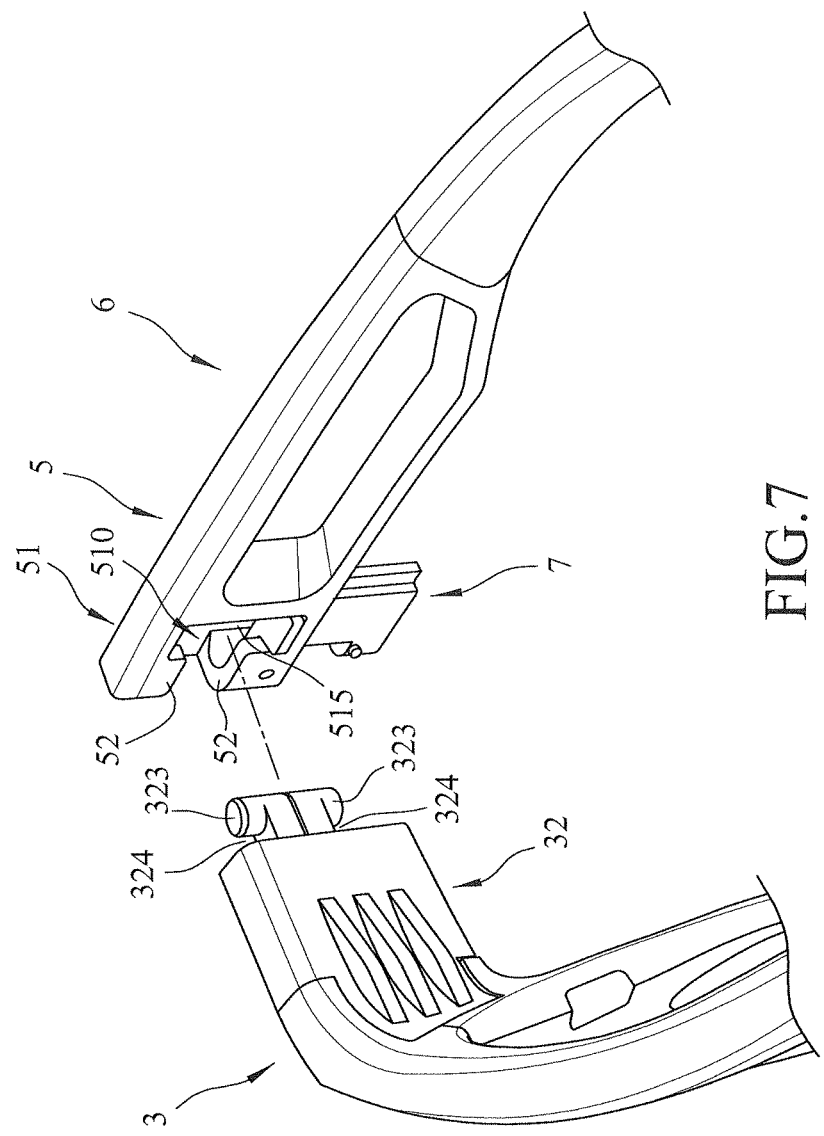
FIGS. 7 to 11 are perspective views for illustrating the assembly process of the first embodiment.
Figure 8:
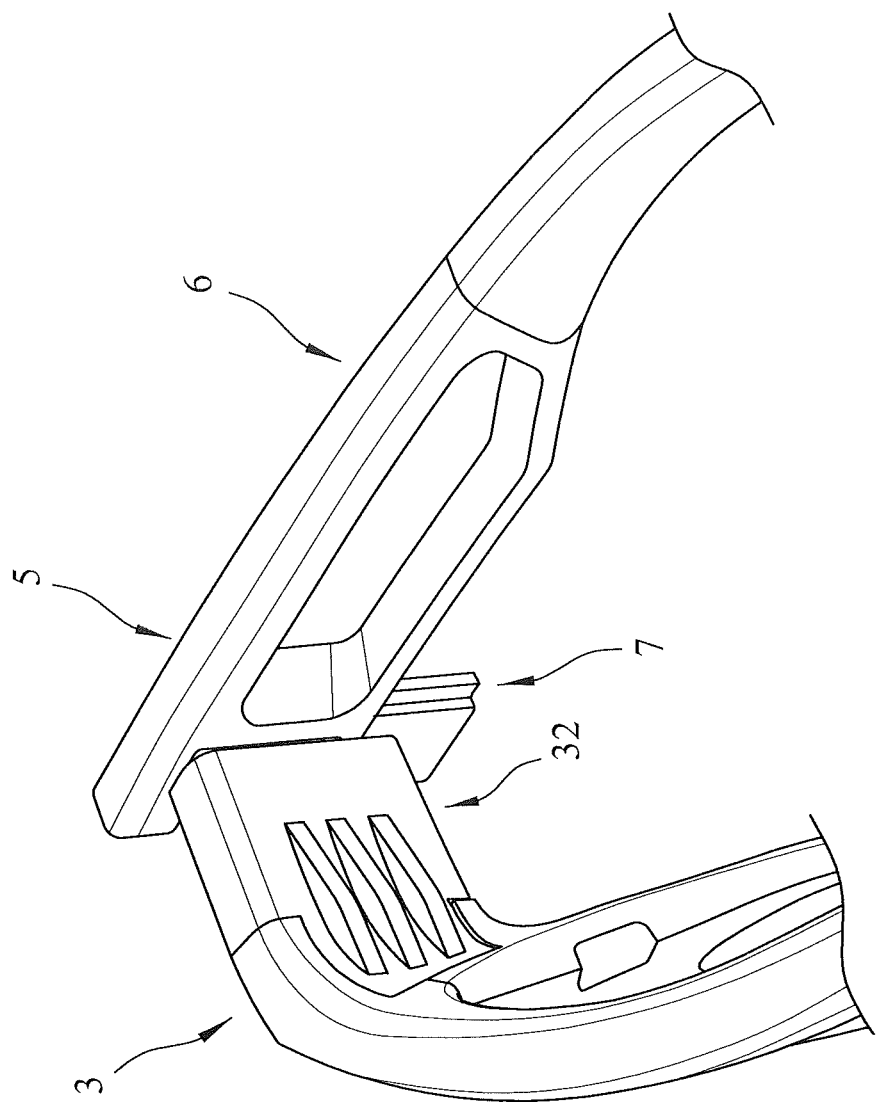
Figure 9:
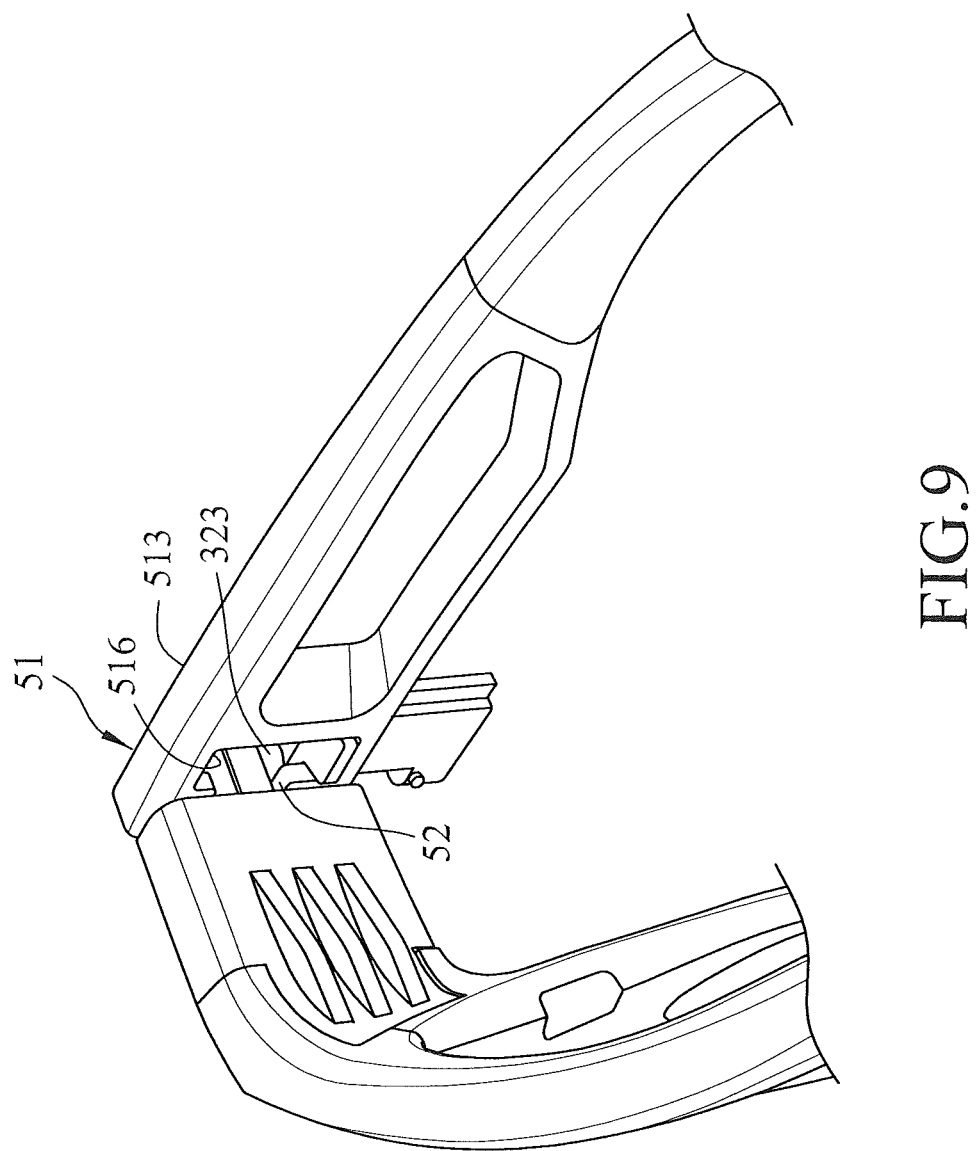
Figure 10:
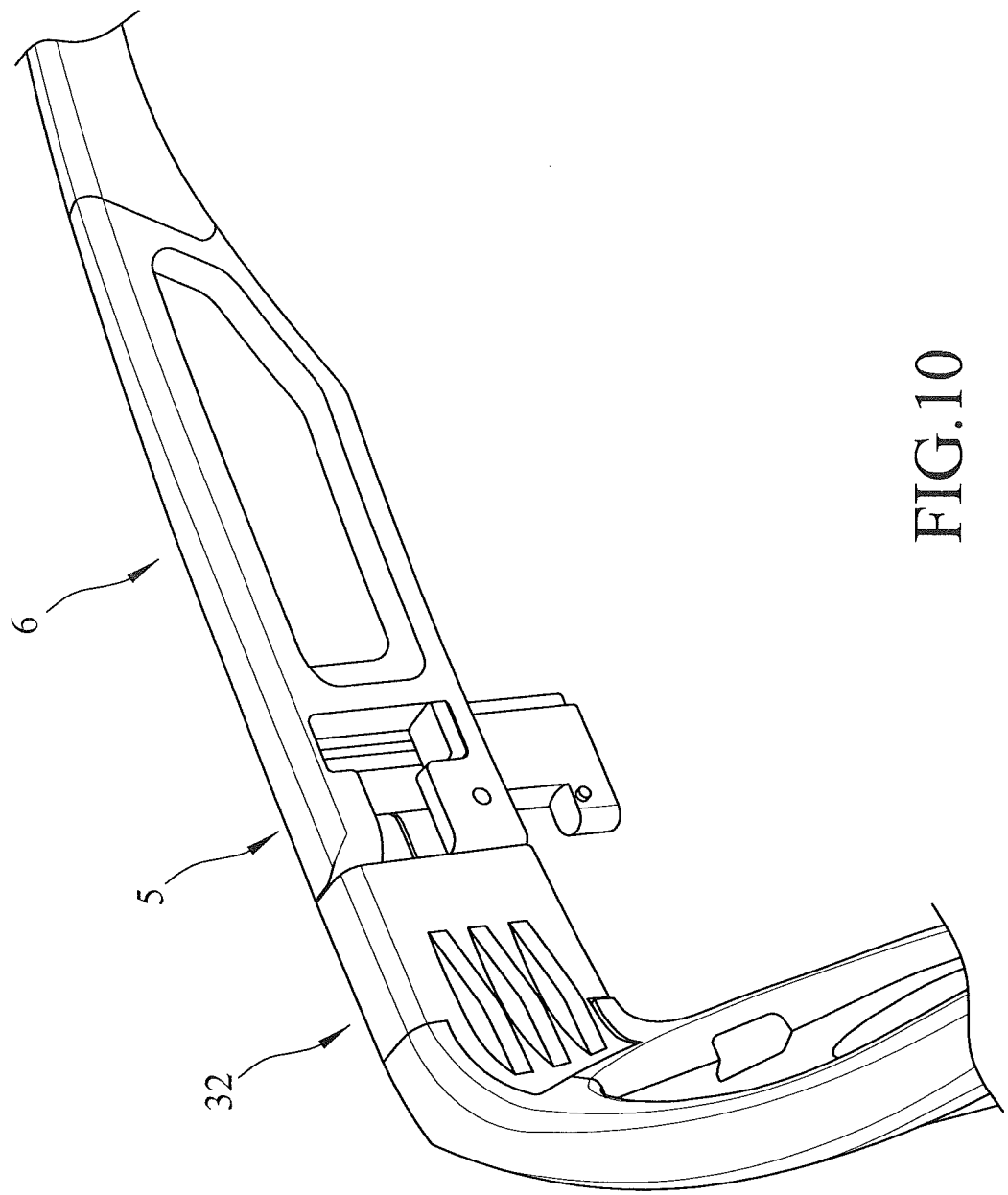
Figure 11:
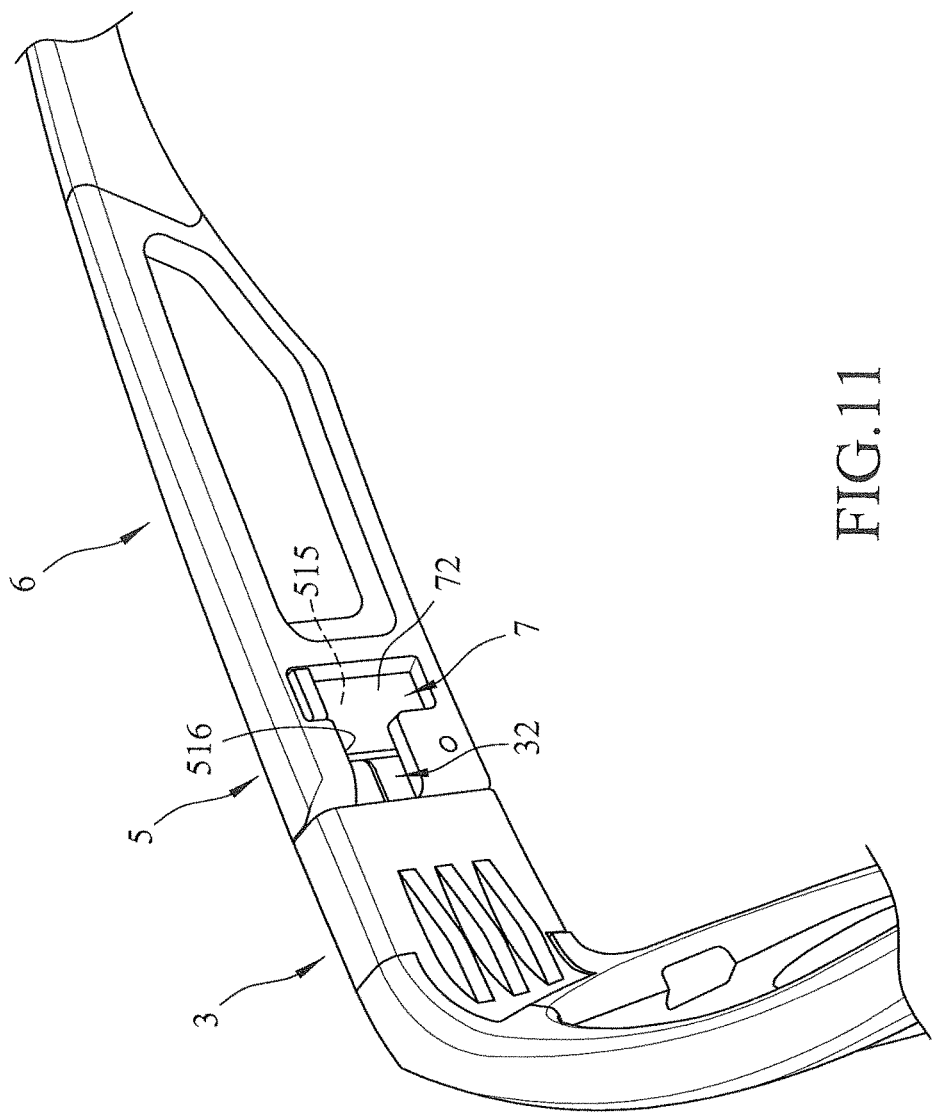

The steps for assembling the eyeglasses assembly 2 are described as follows. First, as shown in FIGS. 7 and 8, with the latch member 7 in the open position, the first coupling member 5 that is disposed on the corresponding temple member 6 can cooperate with the second coupling member 32 that is disposed on the corresponding lateral end of the rim body 31 to form a non-straight angle. Then, the second coupling member 32 is permitted to engage the non-limiting groove section 515 of the slide groove 510, and moveable to slide into and engage the limiting groove section 516. Referring to FIG. 9, when the second coupling member 32 engages the limiting groove section 516 of the slide groove 510, the extension portion 322 of the second coupling member 32 extends through a space between the limiting walls 52 of the first coupling member 5, and each of the projections 323 are limited in the limiting groove section 516 of the slide groove 510 by the respective one of the limiting walls 52. After this step, as illustrated in FIG. 11, when the first and second coupling members 5, 32 cooperatively form a straight angle, the latch member 7 can be moved to the closed position so that the shielding portion 72 of the latch member 7 of each of the coupling units is inserted into the non-limiting groove section 515 of the first coupling member 5, thus preventing the second coupling member 32 from moving into the non-limiting groove section 515. In this way, when the latch member 7 is in the closed position, the second coupling member 32 is prevented from being easily separated from the first coupling member 5.

The steps for disassembling the eyeglasses assembly 2 are described as follows. First, the latch member 7 is moved to the open position, where the first and second coupling members 5, 32 are able to cooperatively form a non-straight angle. Then, the second coupling member 32 is permitted to slide from the limiting groove section 516 into and engage with the non-limiting groove section 515 of the slide groove 510. Finally, the second coupling member 32 can be removed from the non-limiting groove section 515 of the slide groove 510 of the first coupling member 5 to complete the disassembly process.

It should be noted that the latch member 7 can effectively prevent the second coupling member 32 from accidentally separating from the rim unit 3. Also, since the first and second coupling members 5, 32 must cooperatively form a non-straight angle in order for the second coupling member 32 to move along the slide groove 510, the design of the eyeglasses assembly 2 of the present disclosure can be used as an additional protective measure against accidental detachment of the temple members 6 and the rim units 3 should a user forget to move the latch member 7 into the closed position.

Figure 12:
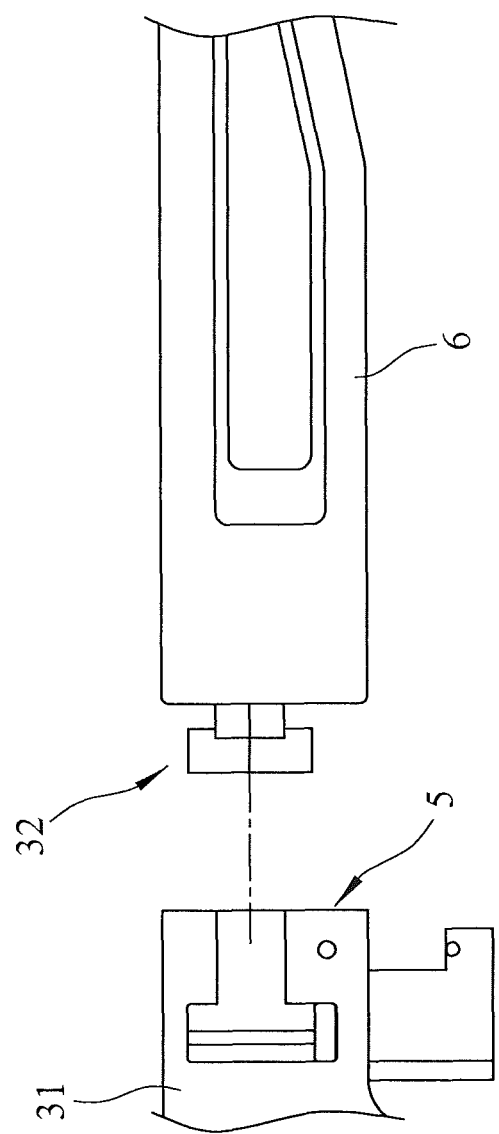
FIG. 12 is a fragmentary side sectional view of a second embodiment of the eyeglasses assembly according to the present disclosure.

As illustrated in FIG. 12, a second embodiment of the eyeglasses assembly 2 according to the present disclosure is shown to have an overall structure generally identical to that of the first embodiment of the present disclosure, with the difference being that the first coupling member 5 is disposed on the corresponding lateral end of the rim body 31, and the second coupling member 32 is disposed on the corresponding temple member 6. In other words, the positions of the first and second coupling members 5, 32 are switched. Having both first and second embodiments increases the versatility in use of the eyeglasses assembly 2 of the present disclosure.

In summary, the design of the slide grooves 510 allows for the user to easily replace the temple members 6 without the use of any tools. Furthermore, the latch members 7 effectively prevent the temple member 6 from accidentally separating from the rim unit 3. Moreover, the design in which the second coupling member 32 is only able to move along the slide groove 510 when the first and second coupling members 5, 32 cooperatively form a non-straight angle, offers an additional protective measure against accidental detachment of the temple members 6 and the rim units 3.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An eyeglasses assembly comprising:
   a rim unit including a rim body;
   two temple members; and
   two coupling units, each of said coupling units pivotally and separably interconnecting a respective one of said temple members and a respective one of two opposite lateral ends of said rim body, and including
   a first coupling member that is disposed on one of the corresponding temple member and the corresponding lateral end of said rim body, and that has a slide groove including a non-limiting groove section, and a limiting groove section connected to said non-limiting groove section,
   a second coupling member that is disposed on the other one of the corresponding temple member and the corresponding lateral end of said rim body, and that movably engages said slide groove in such a manner that said first and second coupling members are permitted to be separated from each other when said second coupling member engages said non-limiting groove section, and said first and second coupling members are prevented from being separated from each other and are pivotable relative to each other when said second coupling member engages said limiting groove section, and
   a latch member that is movably mounted to said first coupling member, and that is movable between a closed position where said latch member is inserted into said non-limiting groove section of said slide groove for preventing said second coupling member from moving into said non-limiting groove section, and an open position where said latch member is substantially removed from said non-limiting groove section to permit said second coupling member to engage said non-limiting groove section.

2. The eyeglasses assembly of claim 1, wherein said first coupling member of each of said coupling units has a surrounding wall substantially defining said slide groove, and two spaced-apart limiting walls extending from said surrounding wall toward each other, and cooperating with said surrounding wall to define said limiting groove section.

3. The eyeglasses assembly of claim 2, wherein said surrounding wall of said first coupling member of each of said coupling units has
   a base wall segment that is connected to the one of the corresponding temple member and the corresponding lateral end of said rim body,
   two side wall segments that are spaced apart from each other, that respectively extend from two opposite ends of said base wall segment and away from the one of the corresponding temple member and the corresponding lateral end of said rim body, and that respectively permit said side wall segments to be connected thereto,
   an outer wall segment that extends from said base wall segment and that interconnects said base wall segment and said side wall segments to substantially define said slide groove, and a through hole that is formed in one of said side wall segments for extension of said latch member of said coupling unit therethrough.

4. The eyeglasses assembly of claim 3, wherein said second coupling member of each of said coupling units has
- a main body portion connected to the other one of the corresponding temple member and the corresponding lateral end of said rim body,
- an extension portion extending from said main body portion and away from the other one of the corresponding temple member and the corresponding lateral end of said rim body, and
- two projections spaced apart from each other and respectively extending from two opposite sides of said extension portion, each of said projections being limited in said limiting groove section of said slide groove by a respective one of said limiting walls when said second coupling member engages said limiting groove section of said slide groove.

5. The eyeglasses assembly of claim 4, wherein said latch member of each of said coupling units includes a shielding portion that is inserted into said non-limiting groove section of said first coupling member of said coupling unit when said latch member is at the closed position, and that is substantially removed from said non-limiting groove section when said latch member is at the open position, and a latching portion protruding from said shielding portion and confined by said surrounding wall for limiting movement of said latch member relative to said first coupling member.

6. The eyeglasses assembly of claim 4, wherein, for each of said coupling units, said extension portion of said second coupling member extends through a space between said limiting walls of said first coupling member when said second coupling member engages said limiting groove section, and said second coupling member is permitted to move along said slide groove when said first and second coupling members cooperatively form a non-straight angle.

* * * * *